Patented Oct. 12, 1943

2,331,432

UNITED STATES PATENT OFFICE 2,331,432

STABILIZATION OF FAT-SOLUBLE VITAMINS

Eric J. Simons, New York, N. Y., and Loran O. Buxton, Belleville, N. J., assignors to National Oil Products Company, Harrison, N. J., a corporation of New Jersey No Drawing. Application July 18, 1941, Serial No. 402,952

10 Claims. (Cl. 99—11)

This invention relates in general to a new non-toxic antioxidant, and in particular to an improved fat-soluble compound for stabilizing the fat-soluble vitamins against oxidation.

It is well known that the fat-soluble vitamins, particularly vitamin A, are readily destroyed directly and indirectly upon exposure to oxygen-containing influences. This is believed to be due, in part, to the oxidation of unsaturated compounds normally associated with these vitamins, whereby fatty peroxides are formed, which in turn decompose and tend to accelerate further oxidation of the unsaturates including the fat-soluble vitamins. Moreover, undesirable odors and tastes are imparted to food products containing the fat-soluble vitamins, whereby their nutritional value is materially lessened along with the decrease in vitamin potency. It has been found that the decrease in vitamin A potency of oils is related to the increase in peroxide value of the oil, and it has been known for some time that the peroxide value is influenced by the degree of oxidation and development of rancidity of the oil.

Various substances have been proposed for inhibiting or preventing the development of oxidative changes in fatty materials containing fat-soluble vitamins, but none of these has proved entirely satisfactory. Examples of such substances are hydroquinone, alpha-naphthol, para-amino-phenol, alpha-naphthylamine, pyrogallol, and malic and maleic acids. Many of these substances are toxic to some extent as are their oxidative derivatives which are produced when the material itself is subjected to an oxidizing influence. Another disadvantage of the majority of these known antioxidants is that they impart undesirable odors and tastes to the food or food products to which they have been added, and in many cases these odors and tastes are as objectionable as those resulting from rancidity.

It is the object of this invention to obviate the foregoing and other disadvantages.

It is a further object of this invention to provide an improved, efficient, non-toxic antioxidant for fat-soluble vitamin-containing oils and concentrates thereof.

Another object of this invention is to provide an efficient, non-toxic antioxidant for fat-soluble vitamin-containing foods.

Other objects of the invention will in part be obvious and will in part appear hereinafter.

We have discovered that by the addition of acetyl methyl carbinol to fat-soluble vitamin-containing fatty materials, the tendency of the fatty material to develop rancidity as well as the decrease in vitamin potency is very greatly inhibited or prevented entirely. The exact mechanism by which acetyl methyl carbinol protects the vitamins and the fatty vehicle therefor from oxidation and the development of rancidity is not definitely known, but it seems that the effect is such that no oxidation of the fats and oils takes place until the acetyl methyl carbinol has been substantially spent by oxidation.

Acetyl methyl carbinol has a further distinct advantage over the previously known antioxidants in that it is non-toxic and highly soluble in fats and oils. Furthermore, the spent acetyl methyl carbinol does not impart undesirable odors, tastes or colors to products to which it has been added.

The antioxidant of the invention may be used to prevent or inhibit oxidation in any fatty or other food product containing vitamins A and/or D which is subject to development of rancidity.

Varying amounts of acetyl methyl carbinol may be added to the fat-soluble vitamin-containing material, depending upon the susceptibility of the vehicle for the vitamins to becoming rancid, and upon the conditions under which the material is stored, with larger amounts being used under conditions of storage favorable to the development of rancidity. In most cases a concentration of approximately 0.1% will be sufficient; however, at times it may be desirable to add quantities up to as high as 5% based on the weight of the fatty material.

Any common method of adding the antioxidant to the material to be treated may be used. It may be added directly, or it may be added to a small amount of the material and the concentrated product then added to the rest of the material.

For a fuller understanding of the nature and objects of the invention, reference should be had to the following examples which are given merely to further illustrate the invention and are not to be construed in a limiting sense, all parts given being by weight.

EXAMPLE I

A vitamin concentrate containing 1,000,000 U. S. P. units of vitamin A per gram was mixed with butter oil to give a product containing 125,000 U. S. P. units of vitamin A per gram. To 2000 parts of this material there were added 2 parts of acetyl methyl carbinol.

Another sample of the butter oil and concentrate was prepared in exactly the same manner as above except that no acetyl methyl carbinol was added.

The samples were then tested for their vitamin A stability by maintaining them under accelerated conditions of destruction, i. e., at 37.5° C., in the presence of air, with the following results:

Table I

| Sample | Vitamin A destruction after— | | |
|---|---|---|---|
| | 4 days | 8 days | 11 days |
| Concentrate in butter oil, no antioxidant | Per cent 60.9 | Per cent | Per cent |
| Concentrate in butter oil, with 0.1% acetyl methyl carbinol | 0.4 | 18.6 | 38.4 |

EXAMPLE II

A sample of halibut liver oil containing 0.1% acetyl methyl carbinol was placed in a stoppered ½ oz. vial and stored in the dark at 37.5° C. Another sample free of acetyl methyl carbinol was similarly stored. The two samples were then tested for their stability with the following results:

Table II

| Sample | Vitamin A destruction after 16 months |
|---|---|
| Halibut liver oil containing 0.1% acetyl methyl carbinol | Per cent 8.1 |
| Halibut liver oil without acetyl methyl carbinol | 18.5 |

EXAMPLE III

A vitamin concentrate was added to morpholine oleate to give a vitamin A concentration of approximately 100,000 U. S. P. units per gram. To this material 0.1% of acetyl methyl carbinol was added. A similar sample was prepared, but containing no acetyl methyl carbinol. Both samples were placed in stoppered ½ oz. vials and stored in the dark at 37.5° C. Tests were then made to determine the stability of the samples with the following results:

Table III

| Sample | Vitamin A destruction after 16 months |
|---|---|
| Vitamin concentrate in morpholine oleate with 0.1% acetyl methyl carbinol | Per cent 3.0 |
| Vitamin concentrate in morpholine oleate without acetyl methyl carbinol | 10.6 |

It will be evident from the above examples and description that fats and oils and food products containing fat-soluble vitamins may by the present invention be very substantially protected against oxidation and the development of rancidity. Consequently the value and utility of such products may be greatly enhanced by the use of the teachings of this invention for foods and other fat-soluble vitamin-containing materials designed for other purposes, such as dermatological preparations, cosmetics, etc.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described our invention, what we claim as new and desire to secure by Letters Patent is:

1. A fat-soluble vitamin antioxidant comprising acetyl methyl carbinol as the active constituent.

2. A vitamin A antioxidant comprising acetyl methyl carbinol as the active constituent.

3. A vitamin D antioxidant comprising acetyl methyl carbinol as the active constituent.

4. A stable fat-soluble vitamin-containing material containing as an antioxidant approximately 0.1% to 5% acetyl methyl carbinol based on the weight of said vitamin-containing material.

5. A stable vitamin A containing material containing as an antioxidant approximately 0.1% to 5% acetyl methyl carbinol based on the weight of said vitamin-containing material.

6. A stable vitamin D containing material containing as an antioxidant approximately 0.1% to 5% acetyl methyl carbinol based on the weight of said vitamin-containing material.

7. A stable vitamin A and D containing material containing as an antioxidant approximately 0.1% to 5% acetyl methyl carbinol based on the weight of said vitamin-containing material.

8. A fat-soluble vitamin-containing oil stabilized against oxidation with approximately 0.1% to 5% acetyl methyl carbinol based on the weight of said oil.

9. A fish liver oil stabilized against oxidation with approximately 0.1% to 5% acetyl methyl carbinol based on the weight of said oil.

10. The unsaponifiable fraction of a fish liver oil stabilized against oxidation with approximately 0.1% to 5% acetyl methyl carbinol based on the weight of said unsaponifiable fraction.

ERIC J. SIMONS.
LORAN O. BUXTON.